(12) United States Patent
Cho et al.

(10) Patent No.: US 9,699,275 B2
(45) Date of Patent: Jul. 4, 2017

(54) APPARATUSES AND METHODS FOR PROCESSING DATA COMMUNICATED BETWEEN DIFFERENT PROTOCOL LAYERS

(71) Applicant: MediaTek Inc., Hsin-Chu (TW)

(72) Inventors: Te-Chung Cho, Taichung (TW); Yu-Ting Chen, Meishan Township, Chiayi County (TW); Hsiu-Chi Hsu, Kaohsiung (TW)

(73) Assignee: MEDIATEK, INC., Hsin-Chu (TW)

( * ) Notice: Subject to any disclaimer, the term of this patent is extended or adjusted under 35 U.S.C. 154(b) by 55 days.

(21) Appl. No.: 14/623,090

(22) Filed: Feb. 16, 2015

(65) Prior Publication Data

US 2016/0241680 A1 Aug. 18, 2016

(51) Int. Cl.
*H04L 29/06* (2006.01)
*H04L 29/08* (2006.01)

(52) U.S. Cl.
CPC .............. *H04L 69/18* (2013.01); *H04L 69/16* (2013.01); *H04L 69/321* (2013.01); *H04L 69/323* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 2005/0147040 A1* | 7/2005 | Vayanos | ........... | H03M 13/2707 370/235 |
| 2005/0169205 A1* | 8/2005 | Grilli | ............... | H03M 13/2703 370/313 |
| 2005/0193309 A1* | 9/2005 | Grilli | ............... | H03M 13/2707 714/752 |
| 2007/0133475 A1* | 6/2007 | Peisa | ................. | H04W 56/0045 370/335 |
| 2014/0098761 A1* | 4/2014 | Lee | ....................... | H04W 74/006 370/329 |
| 2014/0105187 A1* | 4/2014 | Das | ........................ | H04W 28/22 370/336 |
| 2015/0063373 A1* | 3/2015 | Savaglio | ............... | H04W 88/08 370/466 |
| 2015/0163041 A1* | 6/2015 | Kodali | ................... | H04L 5/0058 370/252 |

* cited by examiner

*Primary Examiner* — Kodzovi Acolatse
(74) *Attorney, Agent, or Firm* — McClure, Qualey & Rodack, LLP

(57) ABSTRACT

A mobile communication device including a Baseband processor is provided. The Baseband processor determines an ending period of time of a Transmission Time Interval (TTI) for processing one or more first Service Data Units (SDUs) in a first protocol layer, and prior to the ending period of time, pre-processes one or more second SDUs, which are received during the remaining period of time of the TTI, and re-processes the pre-processed second SDUs in a second protocol layer to generate the first SDUs. Particularly, the second protocol layer is hierarchically higher than the first protocol layer in a communication protocol stack.

8 Claims, 11 Drawing Sheets

APPARATUSES AND METHODS FOR PROCESSING DATA COMMUNICATED BETWEEN DIFFERENT PROTOCOL LAYERS

BACKGROUND OF THE INVENTION

Field of the Invention

The invention generally relates to wireless communications, and more particularly, to reducing the packet transmission delay at the user's end, by segmenting and/or concatenating Radio Link Control (RLC) Service Data Units (SDUs) into RLC Packet Data Units (PDUs) in advance.

Description of the Related Art

With growing demand for ubiquitous computing and networking, various wireless technologies have been developed, including the second generation (2G) cellular technology, such as the General Packet Radio Service (GPRS) technology and the Enhanced Data rates for Global Evolution (EDGE) technology; the third generation (3G) cellular technology, such as the Wideband Code Division Multiple Access (WCDMA) technology and the High Speed Packet Access (HSPA) technology; and the fourth generation (4G) cellular technology, such as the Long Term Evolution (LTE) technology and the LTE-Advanced (LTE-A) technology.

For a typical communication environment, a Transmission Control Protocol (TCP) connection may be established from a User Equipment (UE) to a server on the Internet via a cellular network. However, although the data rate over the air interface provided by the cellular network increases substantially along with the evolving wireless technologies, the throughput of the TCP connection over the air interface remains limited by the packet transmission delay (i.e., the Round Trip Time (RTT)) between the UE and the server due to the fact that the TCP throughput is inversely proportional to the packet transmission delay. In other words, when the packet transmission delay is bounded to a certain level, the TCP throughput cannot be increased any further regardless of the actual radio bandwidth available. Specifically, the relation between the TCP throughput and the packet transmission delay can be described with the formula:

$$\text{TCP\_throughput} \le \frac{RWIN}{RTT},$$

wherein RWIN refers to the TCP Receive Window size which is normally determined only by the server and the UE has no control over it.

Since many applications use TCP as the protocol for communication controls and most TCP applications do not apply a large TCP Receive Window size, the TCP throughput is directly affected by the packet transmission delay. FIG. 1 is an exemplary graph illustrating the relation between the TCP throughput and the packet transmission delay for a TCP connection with a fixed RWIN of 64 KB which is established through the HSPA technology. As shown in FIG. 1, the TCP throughput can reach 40 Mbps when the RTT is 12.5 milliseconds long, while the TCP throughput is limited to 22.5 Mbps when the RTT is 25 milliseconds long.

Therefore, it is desirable to reduce the packet transmission delay for improving the throughputs of TCP applications.

BRIEF SUMMARY OF THE INVENTION

In order to solve the aforementioned problem, the invention proposes to reduce the packet transmission delay at the UE's end (i.e., UE internal latency), by segmenting and/or concatenating Radio Link Control (RLC) Service Data Units (SDUs) into RLC Packet Data Units (PDUs) in advance.

In one aspect of the invention, a mobile communication device comprising a Baseband processor is provided. The Baseband processor is configured to determine an ending period of time of a Transmission Time Interval (TTI) for processing one or more first Service Data Units (SDUs) in a first protocol layer, and prior to the ending period of time, pre-process one or more second SDUs, which are received during the remaining period of time of the TTI, and re-process the pre-processed second SDUs in a second protocol layer to generate the first SDUs, wherein the second protocol layer is hierarchically higher than the first protocol layer in a communication protocol stack.

In another aspect of the invention, a method for processing data communicated between different protocol layers, which is executed by a Baseband processor of a mobile communication device, is provided. The method comprises the steps of: determining an ending period of time of a Transmission Time Interval (TTI) for processing one or more first Service Data Units (SDUs) in a first protocol layer; and prior to the ending period of time, pre-processing one or more second SDUs, which are received during the remaining period of time of the TTI, and re-processing the pre-processed second SDUs in a second protocol layer to generate the first SDUs, wherein the second protocol layer is hierarchically higher than the first protocol layer in a communication protocol stack.

Other aspects and features of the present invention will become apparent to those with ordinary skill in the art upon review of the following descriptions of specific embodiments of the mobile communication devices and the methods for processing data communicated between different protocol layers.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
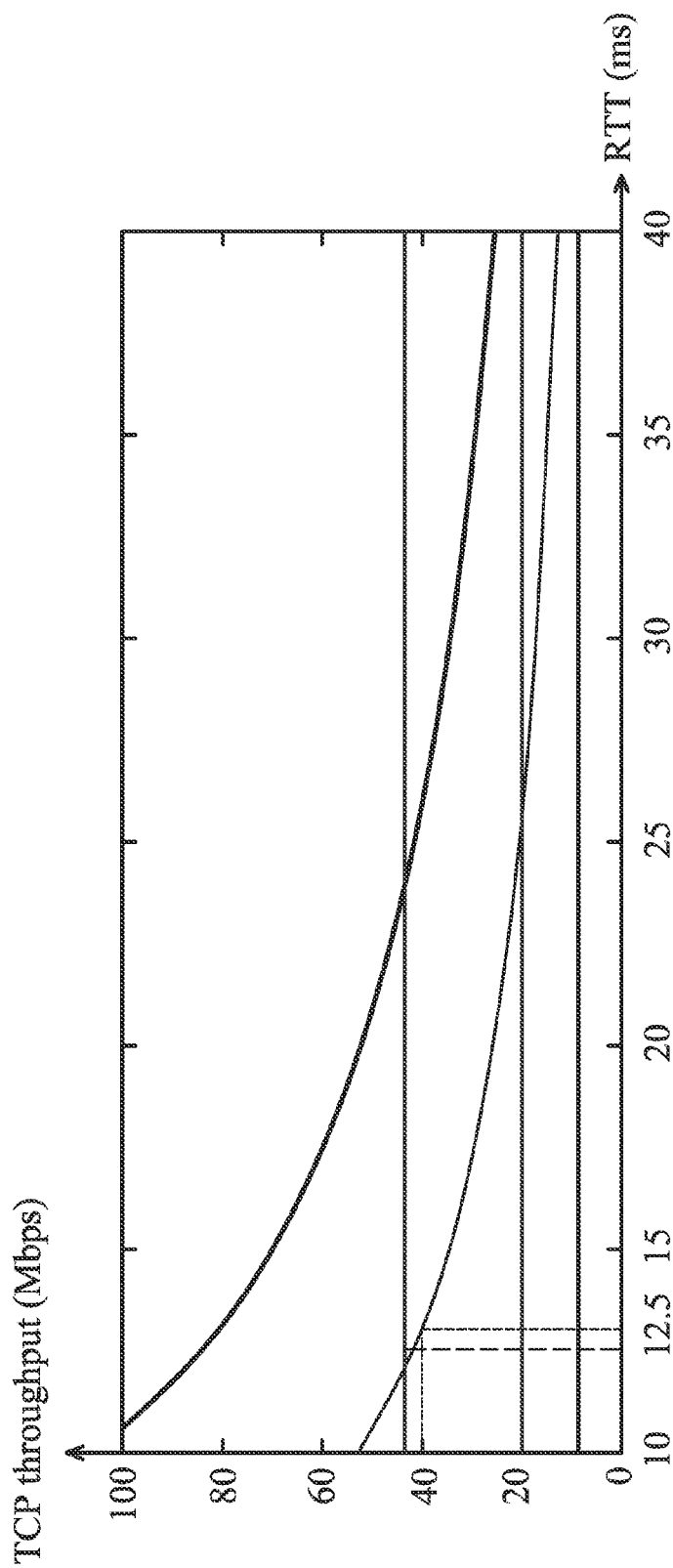
FIG. 1 is an exemplary graph illustrating the relation between the TCP throughput and the packet transmission delay for a TCP connection with a fixed RWIN of 64 KB which is established through the HSPA technology.
Figure 2:
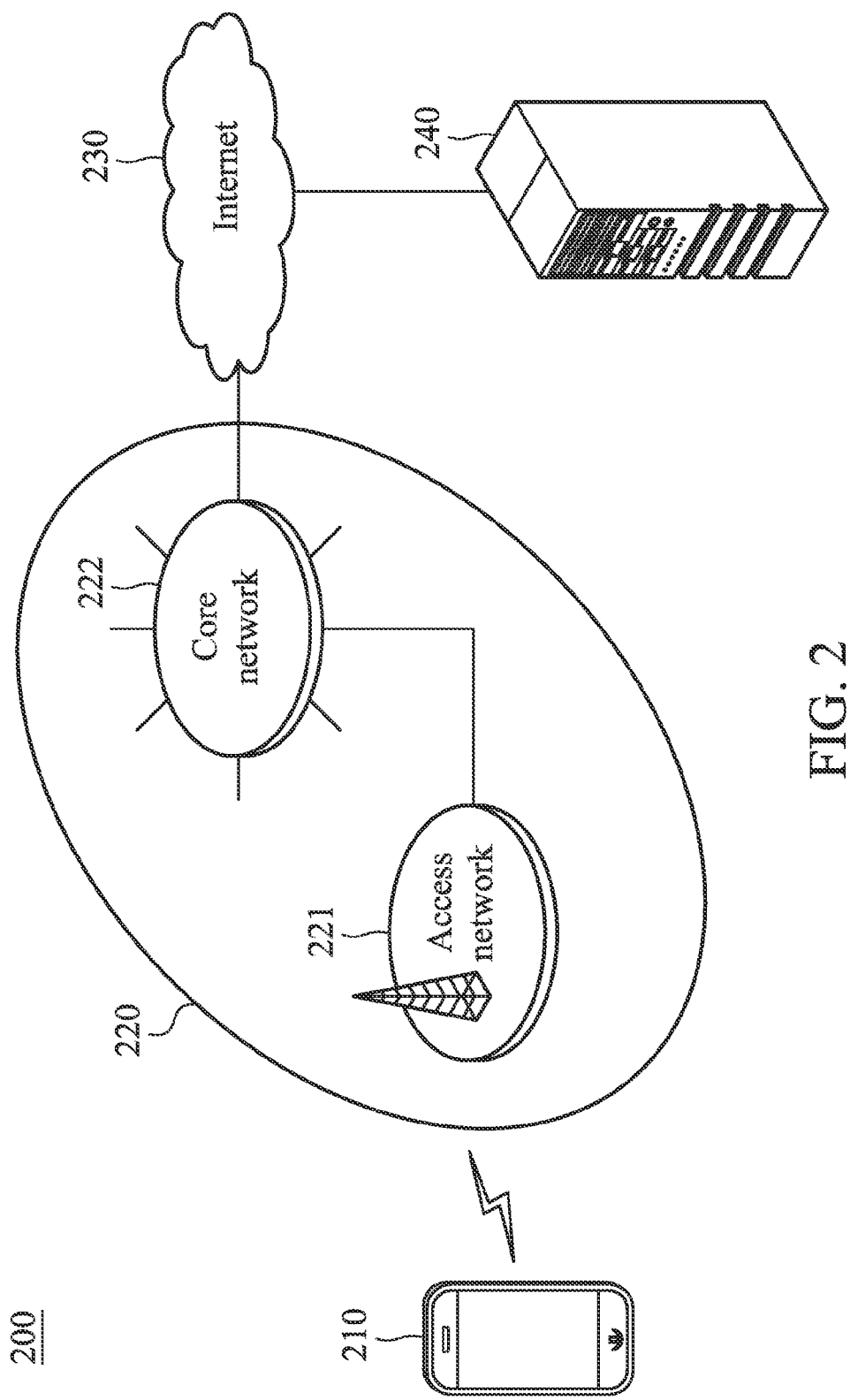
FIG. 2 is a block diagram illustrating a communication environment according to an embodiment of the invention.

FIG. 2 is a block diagram illustrating a communication environment according to an embodiment of the invention. The communication environment 200 comprises a mobile communication device 210, a cellular network 220, the Internet 230, and a server 240. The mobile communication device 210, which may be a feature phone, a smartphone, a panel Personal Computer (PC), or a notebook PC, is wirelessly connected to the cellular network 220 for obtaining wireless accesses. The server 240 is installed on the Internet 230 for providing services concerning TCP applications to the mobile communication device 210 via the cellular network 220. For a TCP connection established between the mobile communication device 210 and the server 240, the RTT is composed of the internal delays of the mobile communication device 210 and the server 240, and the network delay of the cellular network 220, wherein the internal delay of the server 240 and the network delay of the cellular network 220 are beyond the control of the mobile communication device 210. Therefore, the mobile communication device 210 may reduce the RTT by shortening its internal delay.

The cellular network 220 may be a GPRS/EDGE system, a WCDMA/HSPA system, an LTE/LTE-A system, or another system. To clarify further, the cellular network 220 comprises at least an access network 221 and a core network 222, wherein the access network 221 is responsible for processing radio signals, terminating radio protocols, and connecting the mobile communication device 210 with the core network 222, while the core network 222 is responsible for performing mobility management, network-side authentication, and interfaces with public networks, e.g., the Internet 230.

For example, if the cellular network 220 is a GPRS/EDGE/WCDMA/HSPA system, the access network 221 may be a Base Station Subsystem (BSS) which includes at least a Base Transceiver Station (BTS) and a Base Station Controller (BSC), or a Universal Terrestrial Radio Access Network (UTRAN) which includes at least a Node-B (NB) and a Radio Network Controller (RNC), and the core network 222 may be a GPRS core which includes a Home Location Register (HLR), at least one Serving GPRS Support Node (SGSN), and at least one Gateway GPRS Support Node (GGSN). Alternatively, if the cellular network 220 is an LTE/LTE-A system, the access network 221 may be an Evolved-UTRAN (E-UTRAN) which includes at least an evolved NB (eNB), and the core network 222 may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 3:
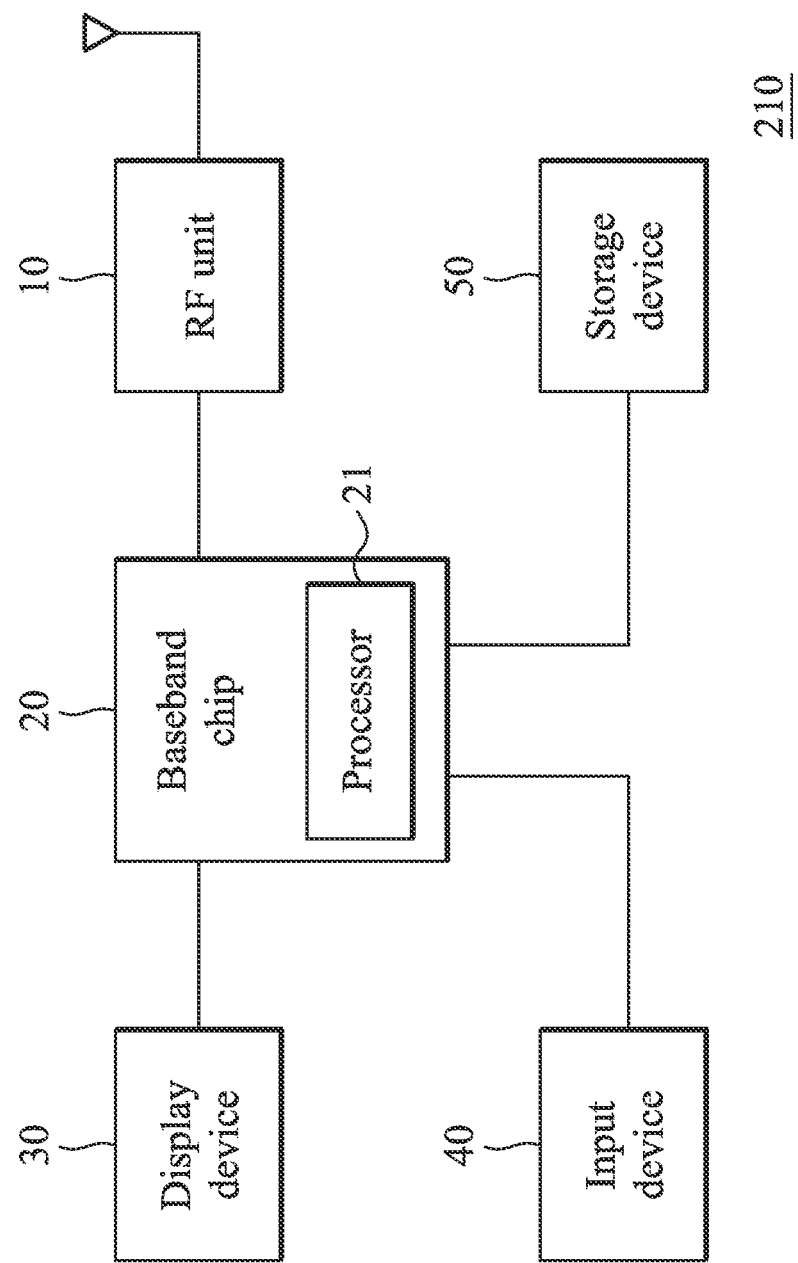
FIG. 3 is a block diagram illustrating the mobile communication device 210 according to an embodiment of the invention.

FIG. 3 is a block diagram illustrating the mobile communication device 210 according to an embodiment of the invention. The mobile communication device 210 comprises a Radio Frequency (RF) unit 10, a Baseband chip 20, a display device 30, an input device 40, and a storage device 50, wherein the RF unit 10, the display device 30, the input device 40, and the storage device 50 are coupled to the Baseband chip 20. The Baseband chip 20 comprises a processor 21 for controlling the communications between the mobile communication device 210 and the cellular network 220 according to the communication protocol of the wireless technology in use. In particular, the processor 21 coordinates the operations of the RF unit 10, the display device 30, the input device 40, and the storage device 50 to perform the method for processing data communicated between different protocol layers in the invention.

The Baseband chip 20 may further contain other hardware components to perform baseband signal processing, including Analog-to-Digital Conversion (ADC)/Digital-to-Analog Conversion (DAC), gain adjusting, modulation/demodulation, encoding/decoding, and so on. The RF unit 10 may receive RF wireless signals via an antenna and convert the received RF wireless signals to baseband signals, which are processed by the Baseband chip 20, or receive baseband signals from the Baseband chip 20 and convert the received baseband signals to RF wireless signals, which are later transmitted via the antenna. The RF unit 10 may also contain multiple hardware devices to perform radio frequency conversion. For example, the RF unit 10 may comprise a mixer to multiply the baseband signals with a carrier oscillated in the radio frequency of the supported wireless technology, wherein the radio frequency may be 900 MHz, 1800 MHz or 1900 MHz utilized in GPRS/EDGE technology, or may be 900 MHz, 1900 MHz or 2100 MHz utilized in WCDMA/HSPA technology, or may be 900 MHz, 2100 MHz, or 2.6 GHz utilized in LTE/LTE-A technology, or others, depending on the wireless technology in use.

The display device 30 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 40 may comprise one or more buttons, a keyboard, a mouse, a touch pad, a video camera, a microphone, and/or a speaker, etc., serving as the Man-Machine Interface (MMI) for interaction with users.

The storage device 50 may be a memory (e.g., Random Access Memory (RAM), Flash memory, or Non-Volatile Random Access Memory (NVRAM), etc.), or a magnetic storage device (e.g., magnetic tape or hard disk) an optical storage device (e.g., Compact Disc Read-Only Memory (CD-ROM)), or any combination thereof for storing communication data, application data, and/or subscriber data.

Figure 4:
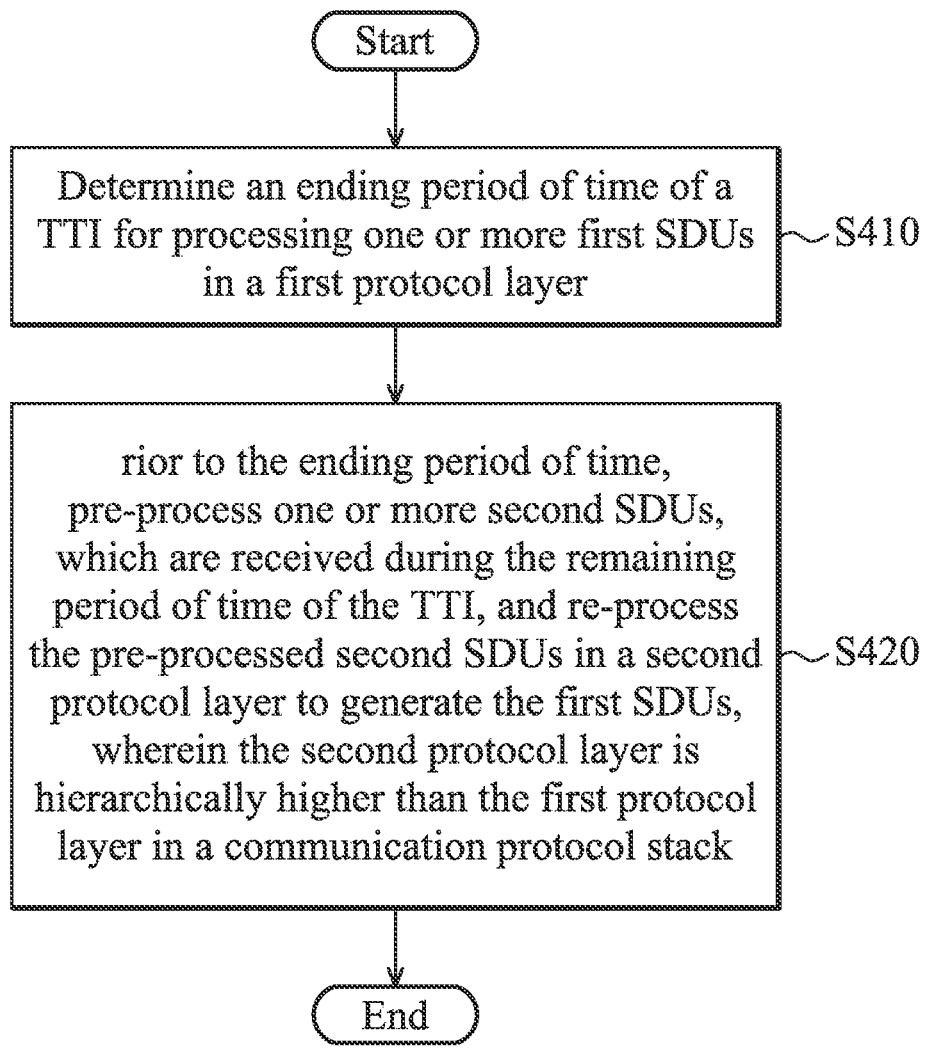
FIG. 4 is a flow chart illustrating the method for processing data communicated between different protocol layers according to an embodiment of the invention.

FIG. 4 is a flow chart illustrating the method for processing data communicated between different protocol layers according to an embodiment of the invention. The method may be applied to a mobile communication device, and more specifically, may be executed by the Baseband processor of the mobile communication device. To begin, the Baseband processor determines an ending period of time of a Transmission Time Interval (TTI) for processing one or more first Service Data Units (SDUs) in a first protocol layer (step S410). Prior to the ending period of time, the Baseband processor pre-processes one or more second SDUs, which are received during the remaining period of time of the TTI, and re-processes the pre-processed second SDUs in a second protocol layer to generate the first SDUs, wherein the second protocol layer is hierarchically higher than the first protocol layer in a communication protocol stack (step S420).

In one embodiment, the first protocol layer is a Medium Access Control (MAC) layer, and the second protocol layer is a Radio Link Control (RLC) layer. Correspondingly, the first SDUs refer to the MAC SDUs, and the second SDUs refer to the RLC SDUs. Regarding the ending period of time for processing MAC SDUs in the MAC layer and the remaining period of time for processing (including pre-processing and re-processing) RLC SDUs in the RLC layer, detailed description will be illustrated in the following FIG. 7. In addition, regarding the pre-processing and re-processing of the RLC SDUs in the RLC layer, detailed description will be illustrated in the following FIGS. 8 and 9.

Taking the GPRS/EDGE/WCDMA/HSPA/LTE/LTE-A technology as an example, the Layer 2 user-plane protocol stack is generally composed of three sub layers: the Packet Data Convergence Protocol (PDCP) layer, the Radio Link Control (RLC) layer, and the Medium Access Control (MAC) layer. Typically, the main functions of the PDCP layer (at the top of the Layer 2 protocol stack) are header compression, security, and support for reordering and retransmission during handover. The RLC layer generally provides segmentation and/or reassembly of upper layer packets in order to adapt them to a size which can actually be transmitted over the radio interface. For radio bearers which require error-free transmission, the RLC layer can also perform retransmission to recover from packet losses. Additionally, the RLC layer performs reordering to compensate for out-of-order reception due to Hybrid Automatic Repeat reQuest (HARM) operation in the MAC layer. The MAC layer (at the bottom of the Layer 2 protocol stack) performs multiplexing of data from different radio bearers. By deciding the amount of data that can be transmitted from each radio bearer and instructing the RLC layer as to the size of packets to provide, the MAC layer aims to achieve the negotiated Quality of Service (QoS) for each radio bearer.

At the transmitting side (i.e., the mobile communication device in this embodiment), each layer can receive a Service Data Unit (SDU) from a higher layer, for which the layer provides a service, and outputs a Protocol Data Unit (PDU) to the layer below. For example, the RLC layer can receive packets from the PDCP layer. These packets are typically called PDCP PDUs from a PDCP perspective and represent RLC SDUs from the RLC point of view. The RLC layer creates packets which are provided to the layer below (e.g., the MAC layer). The packets which the RLC provides the MAC layer are RLC PDUs from an RLC perspective, and MAC SDUs from the MAC point of view. At the receiving side (e.g., the cellular network 220), the process is reversed with each layer passing SDUs up the stack where they are received as PDUs.

Figure 5:
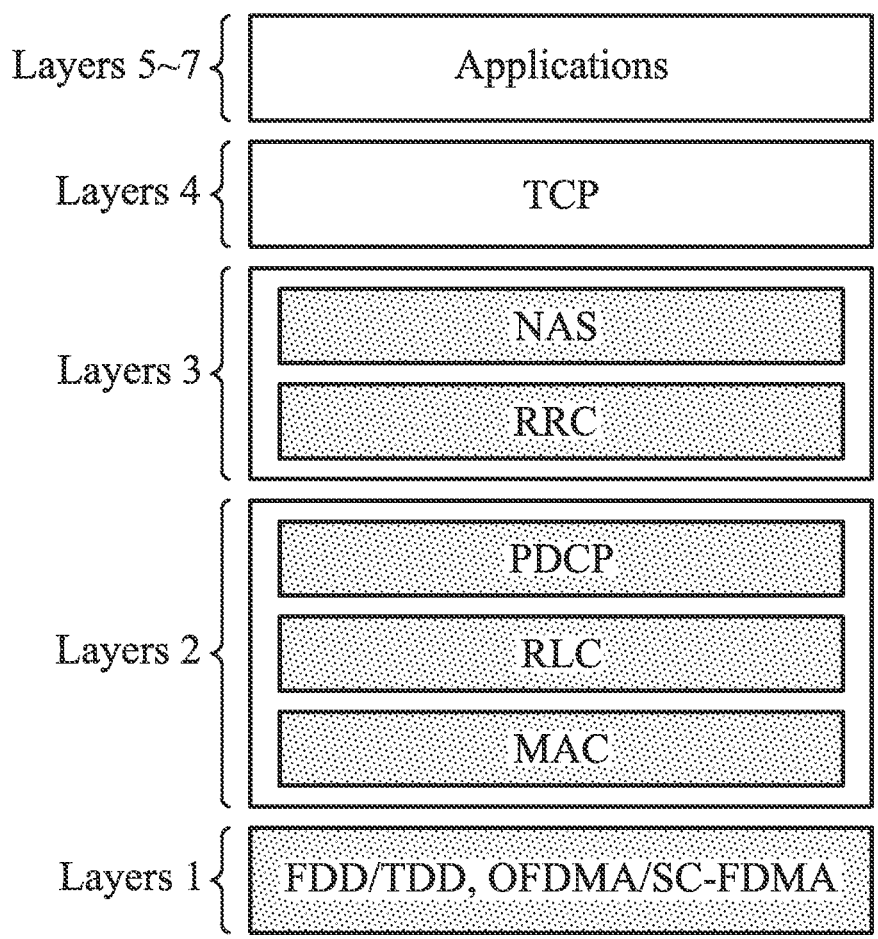
FIG. 5 is a diagram illustrating a communication protocol stack in compliance with the GPRS/EDGE/WCDMA/HSPA/LTE/LTE-A technology.

FIG. 5 is a diagram illustrating a communication protocol stack in compliance with the GPRS/EDGE/WCDMA/HSPA/LTE/LTE-A technology. As shown in FIG. 5, the Layer 1 is the physical layer which provides radio access using the Frequency-Division Duplexing/Time-Division Duplexing (FDD/TDD) or Orthogonal Frequency Division Multiplexing/Single-Carrier Frequency-Division Multiple Access (OFDMA/SC-FDMA) technology. The Layer 2 comprises three sub-layers, including the MAC layer, RLC layer, and the PDCP layer. The Layer 3 comprises two sub-layers, including the Radio Resource Control (RRC) layer and the Non-Access Stratum (NAS) layer. Although not shown, the Layer 3 may further comprise an entity which adopts Internet Protocol (IP) for handling addressing, routing, service type specification, packet fragmentation, packet reassembly and security. The Layer 4 adopts TCP for handling packet sequence numbers, acknowledgement packets, checksums and re-transmissions. The Layers 5 to 7, including the session layer, the presentation layer, and the application layer, are configured to provide application protocols according to the Open Systems Interconnection (OSI) network model.

Figure 6:
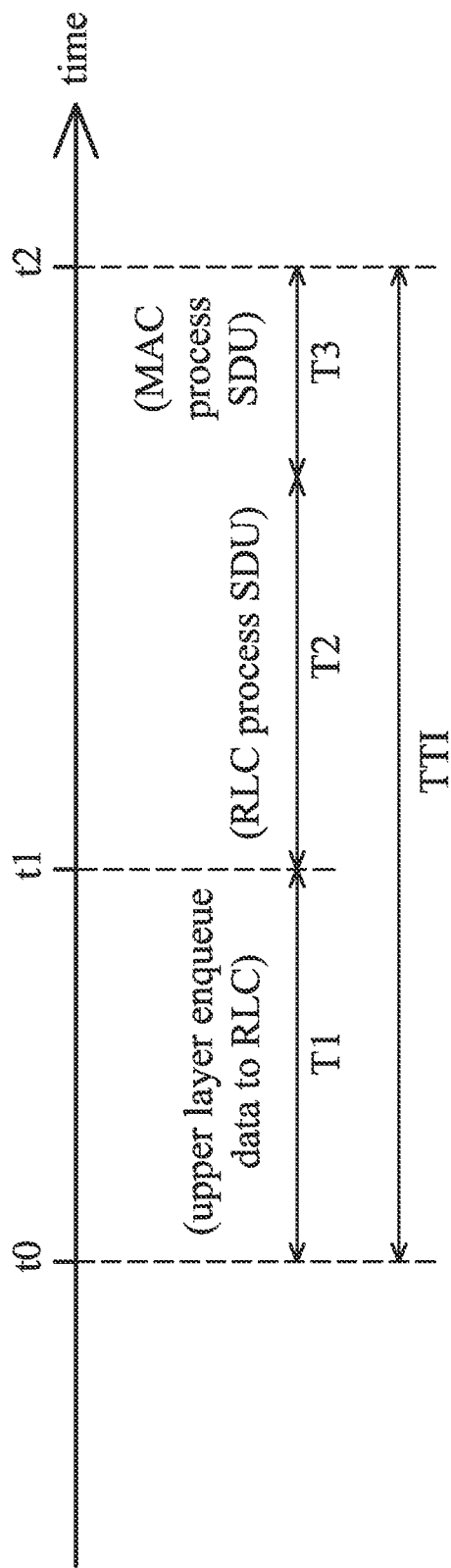
FIG. 6 is a schematic diagram illustrating the timing for data processing in the MAC layer and the RLC layer according to the conventional design of the UE.

FIG. 6 is a schematic diagram illustrating the timing for data processing in the MAC layer and the RLC layer according to the conventional design of the UE. As shown in FIG. 6, a TTI starts at time t0 and ends at time t2, wherein time t0 indicates the time when upper layer data starts to pour in, and time t2 indicates the time when the physical layer sends the data prepared by the MAC layer. The TTI is divided into 3 periods of time, including T1 for enqueuing data received from the upper layer to the RLC layer, T2 for processing the enqueued data (i.e., the RLC SDUs) in the RLC layer to generate the RLC PDUs (i.e., the MAC SDUs), and T3 for processing the MAC SDUs in the MAC layer to generate the data ready to be sent by the physical layer. At time t1, an indication of the physical layer being ready for data transmission is sent from the physical layer to Layer 2. When receiving the indication, the enqueuing of data received from the upper layer is stopped, and Layer 2 starts processing the enqueued data during the periods of time T2 and T3. Thus, only the upper layer data received during the period of time T1 may be processed and sent in the current TTI.

Figure 7:
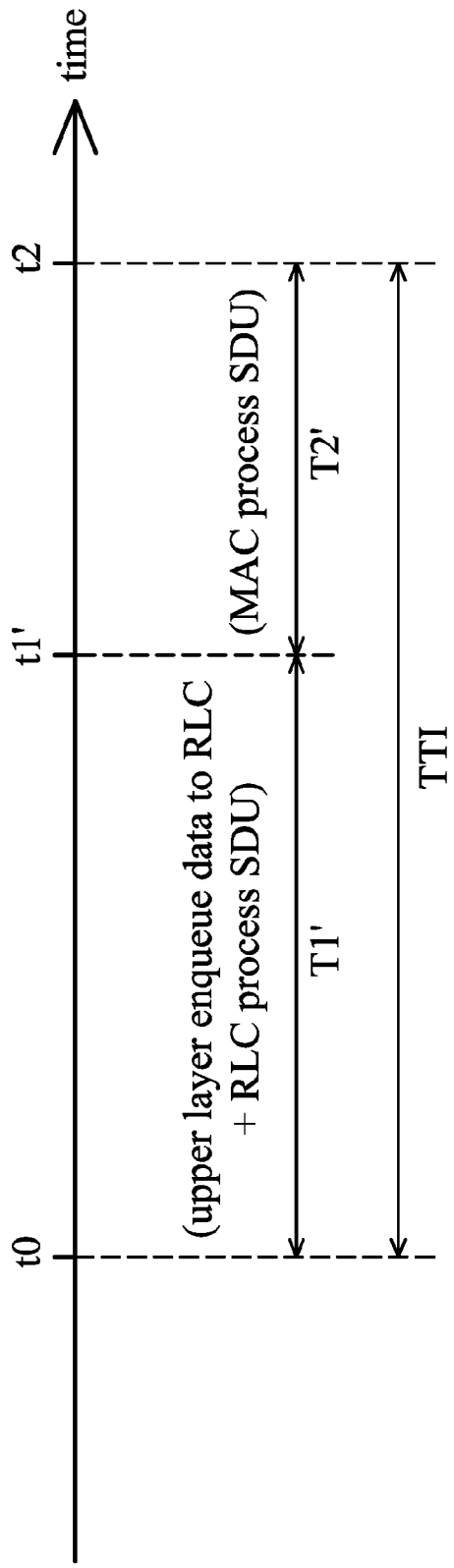
FIG. 7 is a schematic diagram illustrating the timing for data processing in the MAC layer and the RLC layer according to an embodiment of the invention.

FIG. 7 is a schematic diagram illustrating the timing for data processing in the MAC layer and the RLC layer according to an embodiment of the invention. Similar to FIG. 6, a TTI starts at time t0 and ends at time t2, wherein time t0 indicates the time when upper layer data starts to pour in, and time t2 indicates the time when the physical layer sends the data prepared by the MAC layer. However, unlike the conventional design in FIG. 6, the TTI is divided into 2 periods of time, including T1' for enqueuing data received from the upper layer to the RLC layer and processing the enqueued data (i.e., the RLC SDUs) in the RLC layer to generate the RLC PDUs (i.e., the MAC SDUs), and T2' for processing the MAC SDUs in the MAC layer to generate the data ready to be sent by the physical layer. The period of time T2' may be calculated to be an average time required for the MAC layer to finish the data processing, plus a buffering time to even any possible excessive timing requirements for the MAC layer. Specifically, the time t1' is determined by reversing the period of time T2' from the time t2, and that's when an indication of the physical layer being ready for data transmission is sent (from the physical layer to Layer 2). Unlike the conventional design in FIG. 6, the upper layer data received during the period of time T1' may be processed and sent in the current TTI. That is, the invention advantageously enables more data to be sent in a TTI, and thus reduces the UE internal latency which makes up the packet transmission delay (i.e., the RTT).

Figure 8:
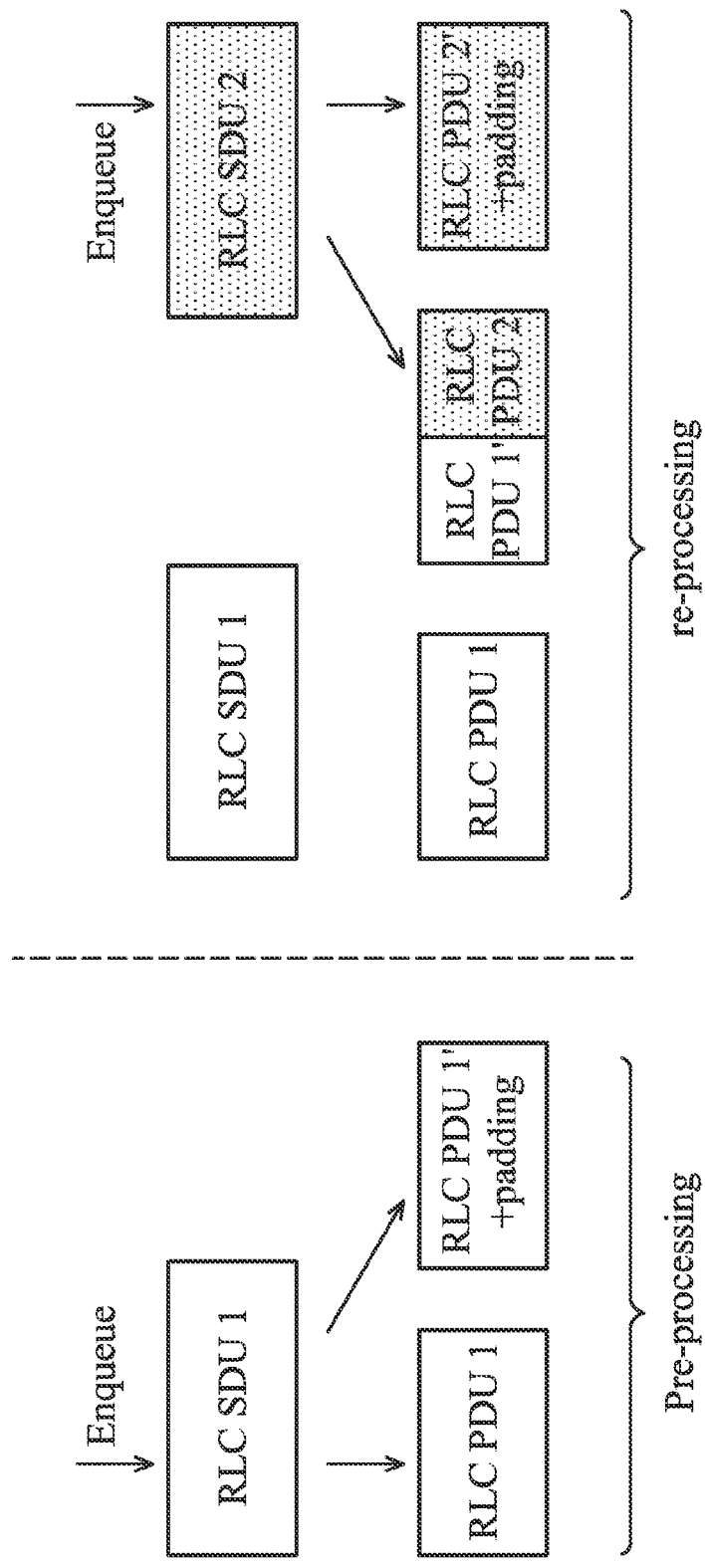
FIG. 8 is a schematic diagram illustrating the pre-processing and re-processing of the RLC SDUs with a fixed size configured for each RLC PDU.

FIG. 8 is a schematic diagram illustrating the pre-processing and re-processing of the RLC SDUs with a fixed size configured for each RLC PDU. When the first RLC SDU is received from the upper layer and there's no RLC PDU generated from pre-processing of the RLC SDU(s), the pre-processing of the first RLC SDU is performed. For pre-processing, the first RLC SDU is segmented into one or more RLC PDUs in the fixed size, and the RLC PDU(s) smaller than the fixed size is filled with padding data to meet the fixed size. That is, the pre-processing of the first RLC SDU generates two RLC PDUs. In other words, the RLC PDUs may be referred to as the pre-processed RLC SDU. After that, when the second RLC SDU is received from the upper layer and there's at least one RLC PDU generated from the pre-processing of the first RLC SDU, the re-processing of the RLC PDU is performed. For re-processing, the padding data in the padded RLC PDU is removed and the RLC PDU is concatenated with a part of the second RLC SDU (i.e., the second SDU is segmented into two parts). Subsequently, the remaining part of the second RLC SDU is filled with padding data to meet the fixed size. Thus, the re-processing of the RLC PDU(s) may reduce the padding data in the pre-processed RLC SDU(s). For example, if the fixed size configured for each RLC PDU is 42 bytes, then only performing the pre-processing on two RLC SDUs will generate four 42-byte RLC PDUs (168 bytes in total), wherein two of them contain padding data. If the re-processing of the RLC PDUs is performed afterwards, only three 42-byte RLC PDUs (126 bytes in total) will be generated, wherein only one of them contains padding data.

Figure 9:
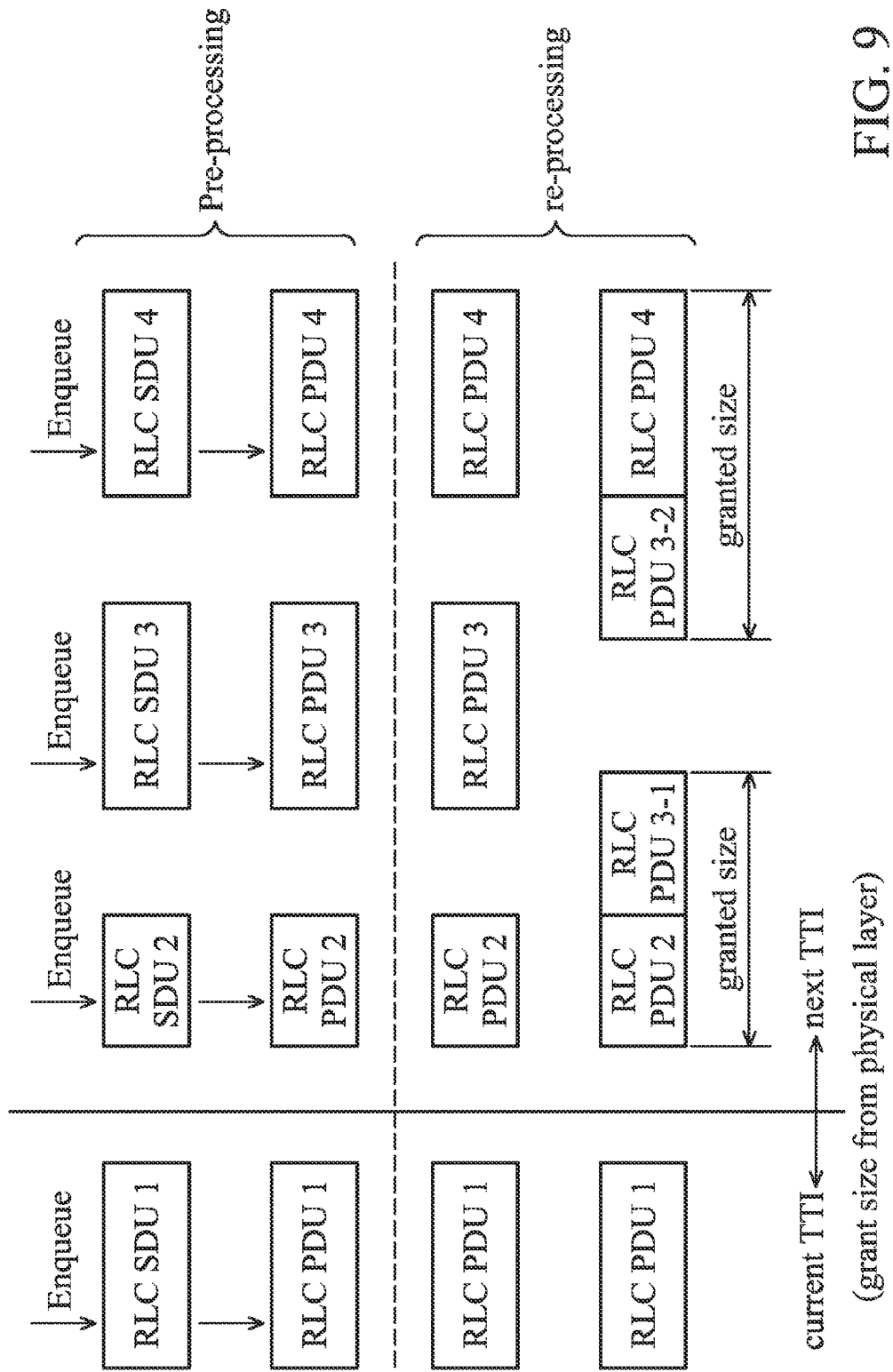
FIG. 9 is a schematic diagram illustrating the pre-processing and re-processing of the RLC SDUs with a flexible size configured for each RLC PDU.

FIG. 9 is a schematic diagram illustrating the pre-processing and re-processing of the RLC SDUs with a flexible size configured for each RLC PDU. As shown in FIG. 9, since a flexible size is configured for each RLC PDU, the pre-processing of the RLC SDUs just keeps the RLC SDUs as they are and no segmentation and padding are required (i.e., directly taking the RLC SDUs as RLC PDUs). In the current TTI, due to there being no other RLC PDU generated from the pre-processing of the RLC SDU(s), the re-processing of the first RLC PDU also keeps the RLC PDU as it is and no segmentation and concatenation are required. Although a grant for the size of each RLC PDU is received from the physical layer in the current TTI, the granted size will only be applied to the re-processing of the RLC PDU in the following TTIs because the granted size is received after the re-processing of the RLC PDU in the current TTI.

In the next TTI, due to there being at least one RLC PDU generated from pre-processing of the RLC SDU(s), the re-processing of the RLC PDUs is performed to segment the third RLC PDU into two parts, wherein the second RLC PDU is concatenated with the first part of the third RLC PDU to meet the granted size, and the fourth RLC PDU is concatenated with the second part of the third RLC PDU to meet the granted size.

Figure 10:
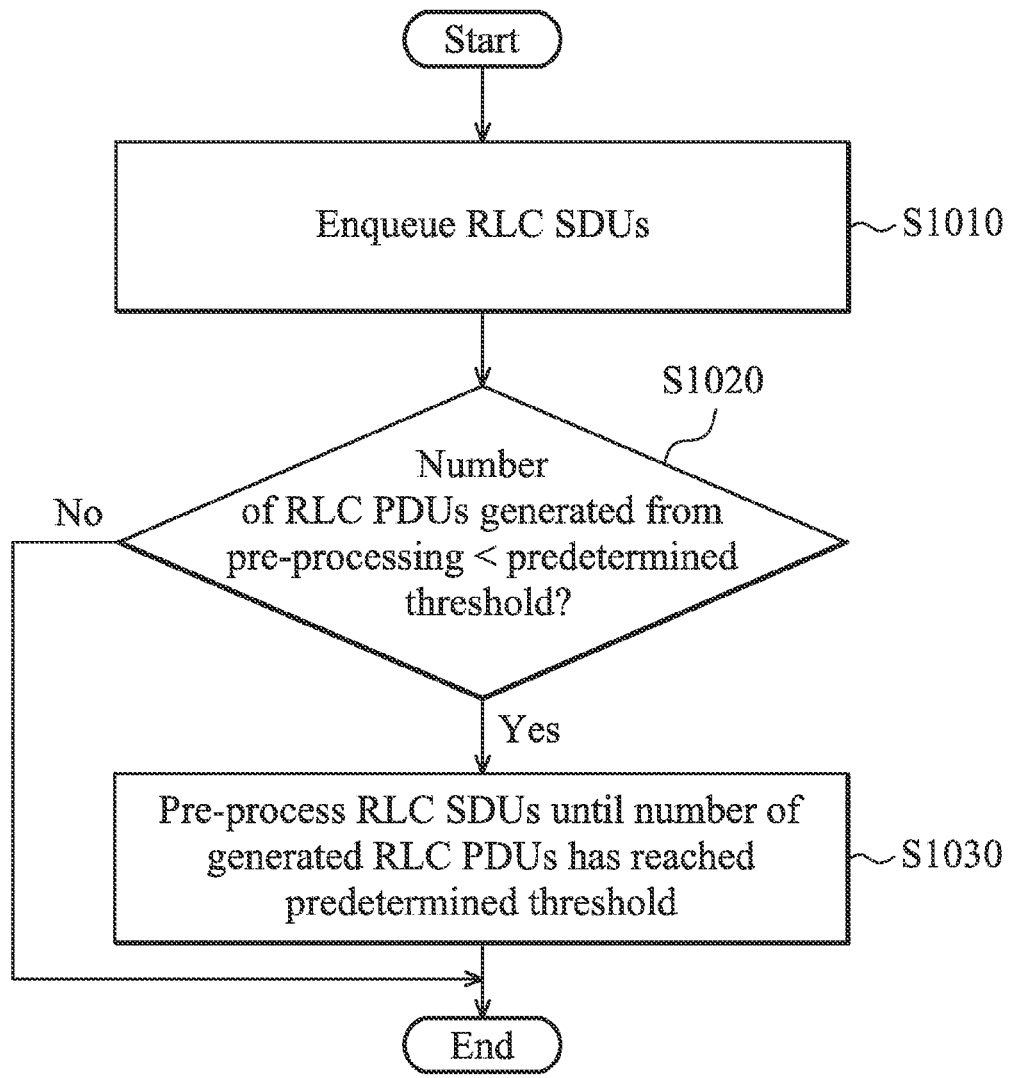
FIG. 10 is a flow chart illustrating the pre-processing of RLC SDUs according to an embodiment of the invention.

FIG. 10 is a flow chart illustrating the pre-processing of RLC SDUs according to an embodiment of the invention. To begin, one or more RLC SDUs received from the upper layer are enqueued (step S1010). Next, it is determined whether the number of RLC PDUs that have been generated from the pre-processing of RLC SDUs is less than a predetermined threshold (e.g., 4) (step S1020). If the number is less than the predetermined threshold, the RLC SDUs are pre-processed (including segmentation and padding as shown in FIG. 8) until the number of generated RLC PDUs has reached the predetermined threshold (step S1030). Otherwise, if the number is greater than or equal to the predetermined threshold, no pre-processing of the RLC SDUs is performed.

Figure 11:
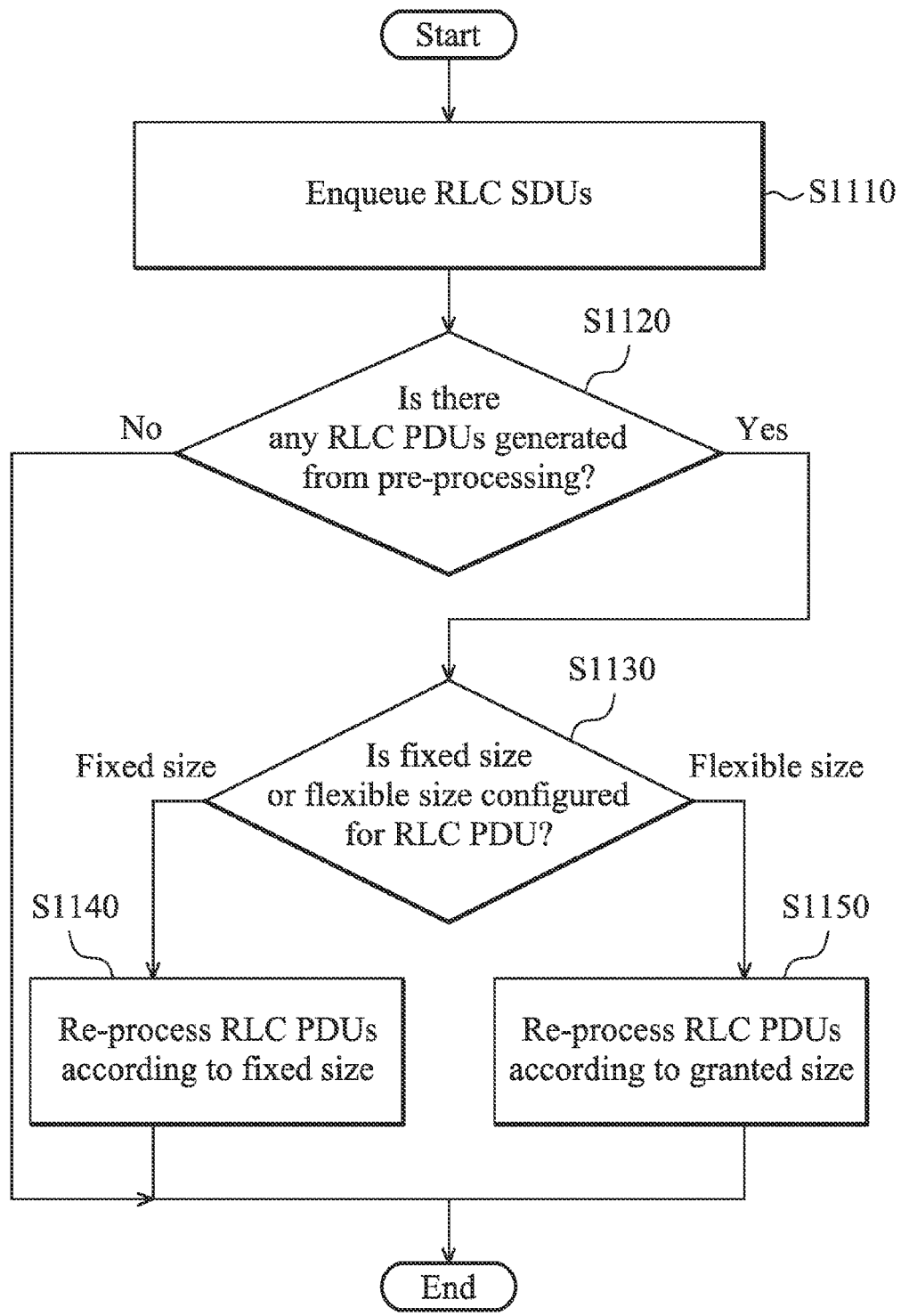
FIG. 11 is a flow chart illustrating the re-processing of RLC SDUs according to an embodiment of the invention.

FIG. 11 is a flow chart illustrating the re-processing of RLC SDUs according to an embodiment of the invention. To begin, one or more RLC SDUs received from the upper layer are enqueued (step S1110). Next, it is determined whether there's at least one RLC PDU that has been generated from the pre-processing of RLC SDUs (step S1120), and if so, it is determined whether a fixed size or flexible size is configured for each RLC PDU (step S1130). If a fixed size is configured, the RLC PDUs that have been generated from the pre-processing of RLC SDUs are re-processed according to the fixed size (including de-padding, segmentation, and concatenation as shown in FIG. 8) (step S1140). If a flexible size is configured, the RLC PDUs that have been generated from the pre-processing of RLC SDUs are re-processed (including segmentation and concatenation as shown in FIG. 9) according to the granted RLC PDU size indicated from the previous TTI (step S1150).

While the invention has been described by way of example and in terms of preferred embodiment, it is to be understood that the invention is not limited thereto. Those who are skilled in this technology can still make various alterations and modifications without departing from the scope and spirit of this invention. For example, the method of FIG. 4 may be implemented in program code stored in a machine-readable storage medium, such as a magnetic tape, semiconductor, magnetic disk, optical disc (e.g., CD-ROM, DVD-ROM, etc.), or others, which is loaded and executed by the processor of the mobile communication device. Therefore, the scope of the present invention shall be defined and protected by the following claims and their equivalents.

What is claimed is:

1. A mobile communication device, comprising:
a Baseband processor; and
a non-transitory computer-readable storage medium, storing computer-executable instructions, which when loaded and executed by the Baseband processor, cause the Baseband processor to perform a method for processing data communicated between different protocol layers, wherein the method comprises:
dividing a Transmission Time Interval (TTI) into a first period of time and a second period of time subsequent to the first period of time;
enqueuing one or more Radio Link Control (RLC) Service Data Units (SDUs) received from a upper layer to a RLC layer in the first period of time and processing the RLC SDUs in the RLC layer to generate one or more Medium Access Control (MAC) Service Data Units (SDUs), wherein the processing of the RLC SDUs comprises pre-processing the RLC SDUs and re-processing the pre-processed RLC SDUs; and
allowing a MAC layer to process the MAC SDUs in the second period of time to generate data to be sent by a physical layer,
wherein the pre-processing of the RLC SDUs comprises: segmenting each of the RLC SDUs to generate one or more Packet Data Units (PDUs) when a fixed size for each PDU is configured in the RLC layer, wherein one or more of the PDUs contain padding to ensure that they are of the fixed size, and the re-processing of the pre-processed RLC SDUs comprises: trimming the padding of the PDUs, and segmenting and concatenating the trimmed PDUs according to the fixed size to re-generate the PDUs.

2. The mobile communication device of claim 1, wherein the pre-processing of the RLC SDUs comprises: directly taking the RLC SDUs as one or more PDUs when a flexible size for each PDU is configured in the RLC layer.

3. The mobile communication device of claim 2, wherein the re-processing of the pre-processed RLC SDUs comprises: segmenting and concatenating the PDUs according to a grant of a PDU size for a previous TTI, to re-generate the PDUs.

4. The mobile communication device of claim 1, wherein the upper layer, the RLC layer, the MAC layer, and the physical layer are comprised in a communication protocol stack which is in compliance with one of the following:
General Packet Radio Service (GPRS) technology;
Enhanced Data rates for Global Evolution (EDGE) technology;
Wideband Code Division Multiple Access (W-CDMA) technology;
High Speed Packet Access (HSPA) technology;
Long Term Evolution (LTE); and
LTE-Advanced (LTE-A) technology.

5. A method for processing data communicated between different protocol layers, executed by a Baseband processor of a mobile communication device, the method comprising:
dividing a Transmission Time Interval (TTI) into a first period of time and a second period of time subsequent to the first period of time;
enqueuing one or more Radio Link Control (RLC) Service Data Units (SDUs) received from a upper layer to a RLC layer in the first period of time and processing the RLC SDUs in the RLC layer to generate one or more Medium Access Control (MAC) Service Data Units (SDUs), wherein the processing of the RLC SDUs comprises pre-processing the RLC SDUs and re-processing the pre-processed RLC SDUs; and
allowing a MAC layer to process the MAC SDUs in the second period of time to generate data to be sent by a physical layer,
wherein the pre-processing of the RLC SDUs comprises: segmenting each of the RLC SDUs to generate one or more Packet Data Units (PDUs) when a fixed size for each PDU is configured in the RLC layer, wherein one or more of the PDUs contain padding to ensure that they are of the fixed size, and the re-processing of the pre-processed RLC SDUs comprises: trimming the padding of the PDUs, and segmenting and concatenating the trimmed PDUs according to the fixed size to re-generate the PDUs.

6. The method of claim 5, wherein the pre-processing of the RLC SDUs comprises: directly taking the RLC SDUs as one or more PDUs when a flexible size for each PDU is configured in the RLC layer.

7. The method of claim 6, wherein the re-processing of the pre-processed RLC SDUs comprises: segmenting and concatenating the PDUs according to a grant of a PDU size for a previous TTI, to re-generate the PDUs.

8. The method of claim 5, wherein the upper layer, the RLC layer, the MAC layer, and the physical layer are comprised in a communication protocol stack which is in compliance with one of the following:
General Packet Radio Service (GPRS) technology;
Enhanced Data rates for Global Evolution (EDGE) technology;
Wideband Code Division Multiple Access (W-CDMA) technology;
High Speed Packet Access (HSPA) technology;
Long Term Evolution (LTE); and
LTE-Advanced (LTE-A) technology.

* * * * *